United States Patent
Brunet et al.

(10) Patent No.: US 6,689,331 B1
(45) Date of Patent: *Feb. 10, 2004

(54) STAGED COMBUSTION PROCESS AND APPARATUS FOR REGENERATING A REFORMING OR AROMATIC COMPOUND PRODUCTION CATALYST IN A MOVING BED

(75) Inventors: François-Xavier Brunet, Vernaison (FR); Emmanuelle Bromet, Rueil Malmaison (FR); Jean-Marie Deves, Vernouillet (FR)

(73) Assignee: Institut Francais du Pétrole, Rueil-Malmaison (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/562,754

(22) Filed: May 2, 2000

Related U.S. Application Data

(62) Division of application No. 09/059,292, filed on Apr. 14, 1998, now Pat. No. 6,103,652.

(30) Foreign Application Priority Data

Apr. 14, 1997 (FR) ............................................ 97 04663

(51) Int. Cl.$^7$ ................................................ B01J 23/90
(52) U.S. Cl. ........................ 422/223; 422/142; 422/144; 422/145; 422/191; 422/192; 422/193; 422/194; 422/211; 422/213; 422/214; 422/216; 422/219
(58) Field of Search .......................... 208/140; 422/139, 422/141, 142, 144, 145, 188, 189, 190, 191, 192, 193, 194, 211, 213, 214, 219, 223, 216

(56) References Cited

U.S. PATENT DOCUMENTS

| | | | |
|---|---|---|---|
| 4,849,092 A | 7/1989 | Hamm et al. | |
| 4,872,970 A | 10/1989 | Boyle | 208/140 |
| 5,034,117 A | 7/1991 | DeBonneville et al. | |
| 5,053,371 A | 10/1991 | Williamson | 502/37 |
| 6,103,652 A | * 8/2000 | Brunet et al. | 502/37 |

FOREIGN PATENT DOCUMENTS

| | | | |
|---|---|---|---|
| EP | 0 258 137 | | 3/1988 |
| EP | 0 378 482 | | 7/1990 |
| FR | 2 642 330 | | 8/1990 |
| GB | 2228426 A | * | 8/1990 |

\* cited by examiner

*Primary Examiner*—Glenn Caldarola
*Assistant Examiner*—Basia Ridley
(74) *Attorney, Agent, or Firm*—Millen, White, Zelano & Branigan, P.C.

(57) ABSTRACT

An apparatus for regeneration a reforming or aromatic compound production catalyst comprises a first combustion zone wherein the first combustion zone receives catalyst and an oxygen-containing gas; a successive second combustion zone; and a conduit communicating the first and second combustion zones for transferring catalysts from the first combustion zone to the second combustion zone. The first combustion zone is isolated from the second combustion zone to prevent passage of oxygen-containing gas from the first combustion zone to the second combustion zone and the severity of the operating conditions increases from the first combustion zone to the second combustion zone.

18 Claims, 2 Drawing Sheets

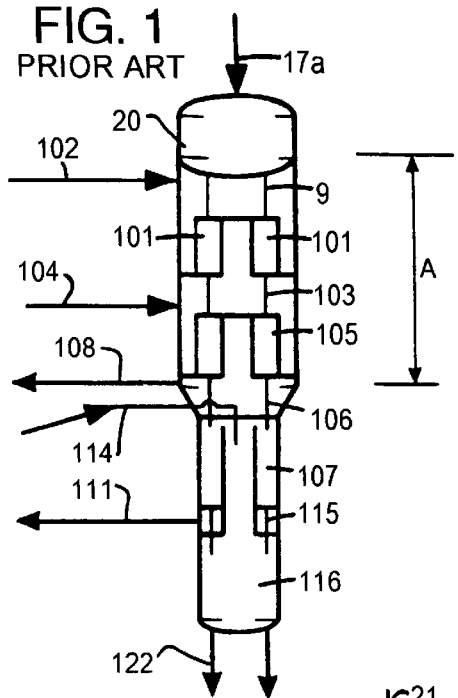
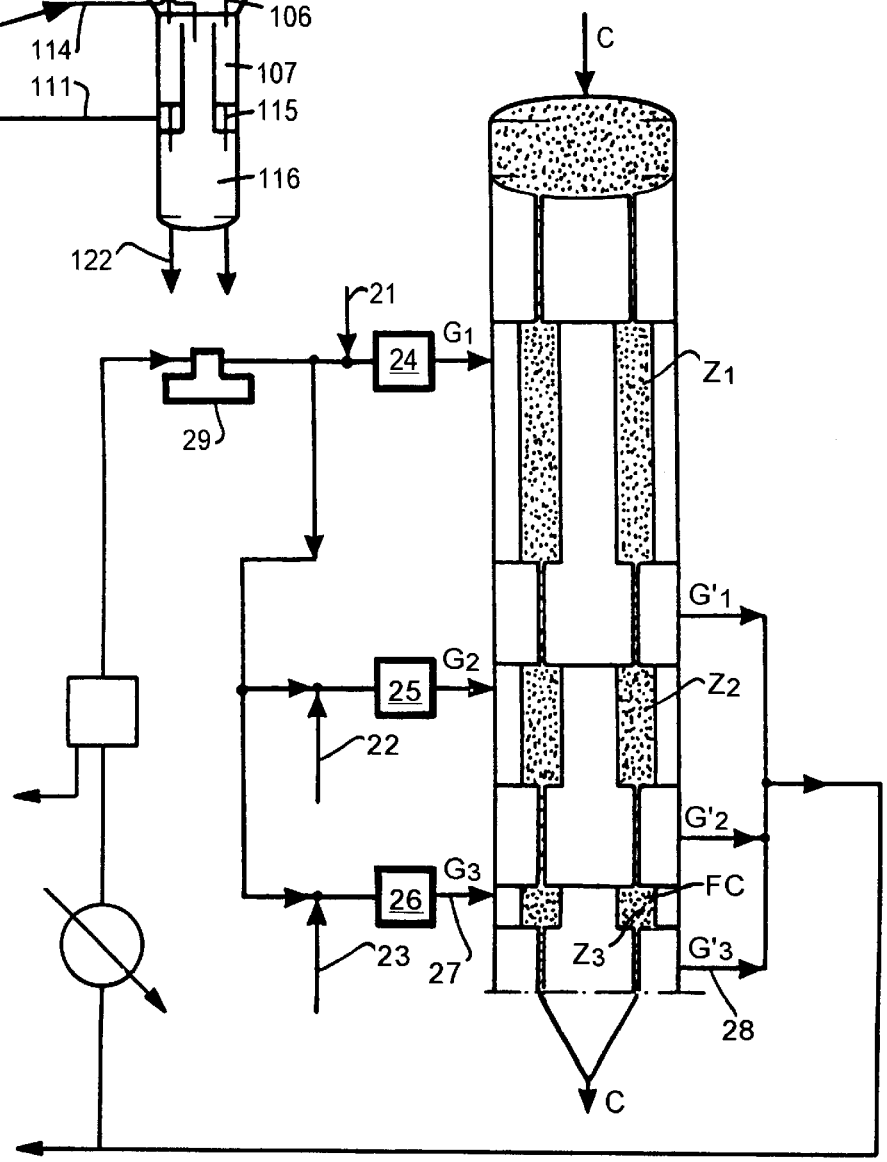

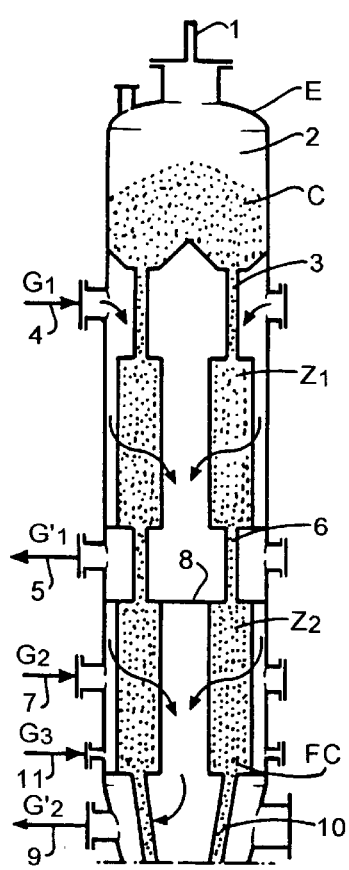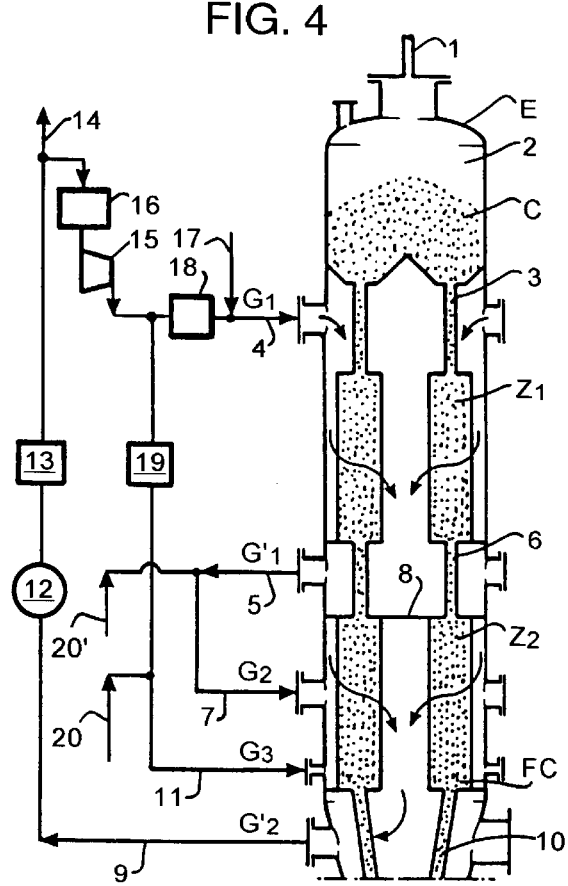

STAGED COMBUSTION PROCESS AND APPARATUS FOR REGENERATING A REFORMING OR AROMATIC COMPOUND PRODUCTION CATALYST IN A MOVING BED

This is a continuation, divisional of application Ser. No. 09/059,299 filed Apr. 14, 1998 now U.S. Pat. No. 6,103,652

SPECIFICATION

The invention relates to moving bed processes for the production of aromatic compounds, in particular for reforming. More particularly, it concerns the combustion step used during regeneration of a used catalyst and is intended to restore its initial catalytic performances.

BACKGROUND OF THE INVENTION

The catalyst generally comprises a support (for example, formed from at least one refractory oxide, the support possibly also including one or more zeolites), at least one noble metal (preferably platinum), and preferably at least one promoter metal (for example tin or rhenium), at least one halogen and optionally one or more additional elements (such as alkalis, alkaline-earths, lanthanides, silicon, group IVB elements, non noble metals, group IIIA elements, etc.). Catalysts of this type contain platinum, for example, and at least one other metal deposited on a chlorinated alumina support. In general, such catalysts are used to convert naphthenic or paraffinic hydrocarbons, which can be transformed by dehydrocyclisation and/or dehydrogenation, for reforming or for the production of aromatic compounds (for example for the production of benzene, toluene, ortho-meta- or para-xylenes). Such hydrocarbons originate from fractionation of crude oil by distillation or other transformation processes.

Such catalysts have been widely described in the literature.

One way of increasing the yields of such reforming or aromatic compound production processes is to reduce the operating pressures at which the different reactions of importance are carried out. As an example, reforming reactions were carried out at 40 bars 30 years ago; 20 years ago, at 15 bars. Today, reforming reactors usually operate at pressures of less than 10 bars, in particular in the range 3 to 8 bars.

The improvement in desirable reactions due to a reduction in pressure is accompanied by more rapid deactivation of the catalyst by coking. Coke, a high molecular weight compound constituted essentially by carbon and hydrogen, is deposited on the active sites of the catalyst. The H/C molar ratio of the coke formed varies from about 0.3 to 1.0. The carbon and hydrogen atoms form condensed poly-aromatic structures with a variable degree of crystalline organisation, depending on the function and nature of the catalyst and the operating conditions of the reactors. While the selectivity of transformation of the hydrocarbons to coke is very low, the amounts of coke accumulated on the catalyst can be large. Typically, for fixed bed units, such amounts are in the range 2.0% to 20.0% to 25.5% by weight. For circulating bed units, such amounts are below 10.0% by weight.

Coke deposition, which is more rapid at low pressure, also requires more rapid regeneration of the catalyst. Current regeneration cycles have become as short as 2–3 days.

Commonly assigned European patent EP-A-0 378 482 discloses a continuous process for regenerating a reforming or aromatic compound production catalyst which can overcome the inherent disadvantages of shorter and shorter cycles. One of the regeneration steps is oxychlorination of the catalyst. The present invention is concerns this step.

In EP-A-0 378 482, the used catalyst slowly travels from top to bottom in a regeneration vessel where it meets, in succession, a first radial moving bed combustion zone, a second radial moving bed combustion zone, an axial moving bed oxychlorination zone and an axial moving bed calcining zone, and:

a) in the first combustion zone, the catalyst is treated at a pressure of 3 to 8 bars, substantially equal to that in the first reforming reactor, at a temperature in the range 350° C. to 450° C., using a combustion gas based on an inert gas circulating as a co-current to the catalyst, comprising 0.01% to 1% of oxygen by volume, the combustion gas originating from a zone for washing the gases from the combustion, oxychlorination and calcining steps;

b) in a second combustion zone, the catalyst arriving directly from the first combustion zone is treated at a pressure of 3 to 8 bars, substantially equal to that in the first reactor, at a temperature which is higher by at least 20° C. than the temperature in the first combustion zone, in the presence of gases originating from the first combustion zone and in the presence of an inert makeup gas to which up to 20% by volume of oxygen is added so that the catalyst is in contact with a gas comprising 0.01% to 1% by volume of oxygen, the gases circulating as a co-current with tile catalyst. The catalyst is then sent to the oxychlorination zone.

In order to present the prior art more clearly, FIG. 1 shows a figure from EP-A-0 378 482 which shows the catalyst supplied via pipe (17a), stored in zone (20) then passing to the regeneration stage via pipes (9) into a first combustion zone (101) then into a second combustion zone (105). Combustion is carried out by injecting a gas charged with oxygen (0.01–1% by volume) and if necessary, a supplemental supply (104) of an inert gas charged with oxygen or air. The combustion step ensemble corresponds to part A of FIG. 1.

SUMMARY OF THE INVENTION

We have established that, during operation of this process, good knowledge of the combustion, and thus of its progress and its control, are guarantees of proper operation of the unit and good regeneration quality. We have thus sought to improve combustion monitoring and control. The process proposed in the present patent application can obtain this result by separate management of the gases in each zone, thus controlling the conditions in each combustion zone and preferably terminating combustion by monitoring and controlling combustion completion.

More precisely, the process of the invention is a process for regenerating a moving bed of catalyst for reforming or for aromatic hydrocarbon production, the catalyst comprising a support, at least one noble metal and at least one halogen, the process comprising a combustion step treating the catalyst in at least two successive combustion zones, the process being characterized in that:

- each combustion zone is separated from the adjacent combustion zones so as to allow catalyst to pass and to prevent the passage of gas;
- at least one oxygen-containing gas is introduced into each zone, and the gases produced are extracted from each zone;
- the severity of the operating conditions in each zone increases in the direction of flow of the catalyst.

Preferably, at least a portion, preferably all, of the gas extracted from one combustion zone is sent to the next zone (in the direction of catalyst flow) with possible oxygen addition (air, for example).

In general, the operating conditions are rendered more severe by increasing the temperature and/or the oxygen content of the incoming gas. Preferably, for each zone the oxygen content in the incoming gas is in the range 0.01% to 2%, the temperature of the inlet gas is in the range 350–600° C., the residence time of the catalyst in one zone is in the range 5 min. to 3 hours and the WHSV (hourly mass flow rate of gas/mass of catalyst in contact with the gas) is in the range 1–50 $h^{-1}$.

The combustion step advantageously ends with a final zone for controlling and monitoring combustion completion in which the oxygen consumption is approximately less than 10% of the oxygen entering that zone. The temperature is preferably substantially constant.

The monitoring and control zone is preferably located in the lower portion of the last combustion zone, thus after the fame front.

Further, a gas containing oxygen in an amount which is higher than that of the gas entering the upstream levels (in the direction of flow of the catalyst) is introduced into the control and monitoring zone.

Thus the present invention defines combustion in a plurality of zones (or stages), where each stage is characterized by a temperature in that stage, a temperature of the incoming oxygen-containing gas, an oxygen content of the incoming gas, a gas flow rate and a duration of exposure of the coked catalyst to these conditions, in order to obtain more efficient combustion.

BRIEF DESCRIPTION OF THE DRAWINGS

FIG. 1 is a schematic depiction of a prior art regeneration vessel.

FIG. 2 is a schematic depiction of one exemplary regeneration vessel of the present invention.

FIG. 3 is a schematic depiction of another exemplary regeneration vessel of the present invention.

FIG. 4 is a schematic depiction of still another exemplary regeneration vessel of the present invention.

The description of the invention will be easily followed by referring to FIG. 2, which can be compared with FIG. 1 relating to the prior art.

FIGS. 3 and 4 also show implementations of the invention, FIG. 3 showing a further disposition of the monitoring and control zone and FIG. 4 showing a gas management mode.

FIG. 2 shows only the combustion step, namely part A of the regeneration process.

In conventional fashion, used catalyst C to be regenerated is introduced into the top (2) of regeneration vessel E via conduit (1).

The catalyst is then introduced into a first combustion zone Z1 via conduits or shafts (3). In this zone, the catalyst undergoes a first burn or combustion using an oxygen-containing gas G1 introduced via conduit (4).

The combustion zones are generally radial, preferably annular in the case of the moving bed shown in FIG. 2, and the bed thus flows in an annular space delimited by two coaxial cylindrical walls, the gas entering via one wall and leaving via the other.

For a moving bed of catalyst, flow is continuous. Intermittent flow is also possible.

After passage through this first combustion zone, gas G'1 is extracted from the zone via conduit (5).

Catalyst C drops via shafts (6) or other conduits into the second combustion zone Z2 into which an oxygen-containing gas G2 is introduced via a pipe (7).

In accordance with the invention, combustion zones Z1 and Z2 are successive and adjacent, i.e., the catalyst leaving combustion zone Z1 passes directly into combustion zone Z2 and undergoes no treatment between the two zones. Combustion zone Z1 and Z2 are physically separated so as to allow catalyst to pass but to prevent the passage of gas, for example the passage of gases G'1 to Z2.

The skilled person will select the most suitable means to carry out this function. In the implementation shown in FIG. 2, a plate (8) is positioned between zones Z1 and Z2 over the whole cross section of regeneration vessel E, with the exception of sections reserved for the passage of catalyst (shafts or other conduits). Of course, a little gas G'1 will pass into zone Z2 with the catalyst in the shafts (6), but it is only a minor portion of the gas.

After passage through the second combustion zone, gas G'2 is extracted from the zone via conduit (9); more generally the gas from the last combustion zone is extracted from the vessel. Catalyst C then drops via shafts or other conduits (10) to an oxychlorination zone which is not shown here. After combustion, it is treated in known manner to ensure regeneration (oxychlorination, calcining). It should also be noted that, preferably, the gases from the oxychlorination zone are extracted from the oxychlorination zone to prevent their passage into the last zone of the combustion step. Thus no chlorine or chlorinated compound is introduced into the gases entering combustion zones Z1 and Z2.

FIG. 2 shows two successive combustion zones, the number of combustion zones being selected by the skilled person as a function of the unit to be designed. They are arranged and operated in the same manner as the zones described above.

In an advantageous embodiment, at least part, preferably all, of gas G'1 leaving zone Z1 is introduced into zone Z2 with gas G2, or after optional oxygen addition to form gas G2; this disposition allows maximum use of the remaining oxygen and minimum addition of oxygen.

This separate management of the gases in each combustion zone means that the incoming and outgoing gas temperatures are precisely known at any time along with their oxygen contents. In addition to maximum oxygen use, this management enables coke combustion to be controlled by controlling the operating conditions in each zone.

Preferably, this is followed by a combustion completion monitoring and control operation in a final zone of the combustion step.

In the implementation of FIG. 2, this operation is carried out in the lower portion (in the direction of catalyst flow) of the last combustion zone Z2, this lower portion thus constituting a monitoring and control zone FC.

In a further implementation shown in FIG. 3, monitoring and control zone FC is a zone which is not included in the last combustion zone Z2.

Monitoring and control zone FC is distinguished from a combustion zone in that in zone FC, the approximate oxygen consumption is less than 10% of the incoming oxygen. The temperature there advantageously remains substantially constant (variation of 3% maximum, preferably 2% maximum) excluding measurement errors and heat losses.

An oxygen-containing gas G3 enters zone FC via conduit (11) in FIG. 2 (and 27 in FIG. 3), the gas being extracted via conduit (9) in FIG. 2 after passage through zone FC via which gas G'2 which has traversed combustion zone Z2 is also evacuated, or via conduit 28 in FIG. 3, independently of G'2.

The skilled person will select suitable means for measuring the oxygen consumption in zone FC. As an example, the variation in the oxygen content between the inlet and outlet from zone FC can be measured from a variation in the inlet content (at the same total gas flow rate) and the variation in the content at the zone outlet. In general, if the operation of the preceding stages is correct, the oxygen consumption in zone FC must be small (less than 2–3%).

A further method is to provide means for measuring the temperature and/or oxygen content either in the outgoing gas (for example in FIG. 3 where the gas leaves independently of the other gases from the combustion step) or at the wall via which the gas leaves zone FC (FIG. 2, for example).

Means for measuring the temperature of the catalytic bed or the catalyst entering and leaving the monitoring and control zone can also be used.

Thus a simple means for monitoring and controlling the correct operation of the combustion stages is provided, and independent management of the gases of each stage enables combustion faults to be remedied rapidly and easily by varying the temperature or the oxygen content in one or more zones.

If a comparison of oxygen contents or the gas and/or catalyst temperatures leads to variations which are beyond allowable values for the process (less than 10% for oxygen and at most 3% for the temperature), then at least one operating condition in at least one combustion zone is modified so as to correct the difference. The oxygen content and/or the temperature of the inlet gas could be modified.

The operating conditions are selected for each zone and strictly controlled in each zone (in contrast to the prior art) so as to reduce any deleterious effect of combustion on the catalyst by as much as possible.

The products formed by this exothermic reaction are principally carbon dioxide and water. The conditions brought about by this combustion are unquestionably those which are the most favourable for ageing or degradation of the catalyst. In particular, the presence of water at a high temperature is responsible for a gradual change in the porous support of the catalyst. Typically, the specific surface area of a fresh catalyst is close to 250 m$^2$/g. At the end of its life, this value falls to below 100 m$^2$/g.

The quality of combustion is a function of a number of parameters:
  the temperature of the incoming oxygen-containing gas, sufficient to initiate the reaction and which accelerates the rate of this reaction;
  the oxygen content of the gas, which affects the temperature rise in the bed, and thus whether or not the catalyst changes; it also favours the oxygen diffusion rate in the particle;
  the quantity of oxygen, which determines the quantity of coke which can be burned.

In the first phases (or moments) of combustion, the oxygen supplied is theoretically entirely consumed, if the temperature of the gas and the oxygen content are sufficient to initiate the reaction. At that moment, a portion of the coke is very easily and rapidly burned off.

We have established that coke which is more difficult to burn can remain: at the temperature at which the first portion of coke is easily burned, a very long time is required to eliminate the other portion.

According to the inventors, this difficulty can be due to a number of reasons, among them:
  the presence of different types of coke characterized by different initiation temperatures, different crystalline organisations, and different H/C ratios;
  localisation of coke: the coke deposited near to the metallic phase of the catalyst is more hydrogenated than coke accumulated on the catalyst support;
  diffusion problems: coke on the surface of the catalyst particle burns more easily than that in the particle core. An oxygen diffusion problem is added to the chemical reactivity problems for coke deposited in the core of the catalyst grain;
  the size of the coke clusters: in a thin layer, it burns faster than when it is in large clusters.

These reasons imply that there is a multitude of coke species;
  coke with different initiation temperatures: each is characterized by a temperature threshold above which the reaction can initiate satisfactorily and be completed. In this case, a number of operating temperatures can be defined;
  coke with different burning rates, for example: surface coke and core coke. The first is consumed more rapidly in depleted oxygen. The second is less accessible and is "harder" to burn; it constitutes the last portion of the coke to be eliminated, and can be burned in an excess of oxygen if it is considered that there are no risks of combustion runaway. It is thus possible to use a high oxygen content and a higher temperature to encourage the combustion reaction of this hard coke.

Instead of using identical gas conditions which are adapted for an "average" coke as in the prior art, the present invention proposes conditions for multi-staged coke combustion carried out in the steps described above.

Each stage (zone) receives at least one oxygen-containing gas at:
  a WHSV in the range 1 to 50 h$^{-1}$, preferably 10–40 h$^{-1}$, more preferably 15–35 h$^{-1}$;
  a temperature T in the range 350° C. to 600° C., preferably 400° C. to 600° C.;
  an oxygen content of at most 2%, preferably 0.5–1.5%, and generally over 0.5%;
  each zone has a volume V corresponding to a catalyst residence time of 5 min. to 3 hours.

For each zone, the inlet temperature of the oxygen-containing gas and the oxygen content are such that:
  the maximum temperature at the bed outlet is less than a maximum allowable value, depending on the materials used (for example 770° C. for a low alloy steel);
  the maximum temperature elevation between the bed inlet and outlet is less than 200° C., preferably of the order of 100° C.;
  the temperature in the zone is at least 350° C., advantageously at least 400° C. and less than 600° C., preferably less than 580° C. and more preferably at most 550° C.;
  the temperature in the zone is higher than the temperature in the immediately preceding zone. Thus in zone Z2, the temperature T2 is higher then T1 in zone Z1.

These ever higher temperatures result from transferring hot catalyst from the preceding zone, from introducing hot oxygen-containing gas, from the exothermal combustion reaction which develops, and from the increasing severity of the operating conditions.

In order to guarantee correct combustion, hotter and hotter gases are preferably introduced into the zones encountered during catalyst flow. Thus temperature T2 of the gas G2 entering the second zone is advantageously higher than that T1 of the gas G1 entering the first zone, and T3 is higher than T2 (T3: temperature in monitoring and control zone).

More precisely, gas at a temperature which is at least equal to that at the end of combustion in the last combustion zone enters zone FC:

the oxygen content of the gas introduced also increases with the zone number which the catalyst enters, and the monitoring and control zone corresponds to the highest oxygen content (quantity higher than that of the gases entering the upstream zones).

The embodiment shown in FIG. 3 illustrates the operating conditions of each zone and The gas management.

In regeneration vessel E, a moving bed of catalyst C successively traverses zones Z1, Z2 and Z3 with temperatures T1, T2 and T3.

The volume of these zones reduces in the direction of catalyst flow. Volumes V1, V2 and V3 respectively of zones Z1, Z2 and Z3 are such that V1>V2>V3. Different volumes are selected in this way but equal volumes or volumes which are different in another way can also be envisaged.

A compressor (29) supplies a total gas stream divided into three streams supplying zones Z1, Z2 and Z3.

An oxygen analyser and a temperature sensor are located in each gas stream so that the oxygen content and temperature can be adjusted if necessary to satisfy specifications.

Oxygen is supplied via pipes 21, 22 and 23 respectively for each gas stream, and the temperature is adjusted by means 24, 25 and 26 respectively (ovens in FIG. 3).

Thus gases G1, G2 and G3 respectively enter zones Z1, Z2 and Z3 with an oxygen content and temperature which is in agreement with the specifications.

As an example, the respective values for gases G1, G2 and G3 are:

T1 about 460° C.;
T2 about 480° C.
T3 about 520° C.

And for oxygen contents, respectively:

O1 about 0.8
O2 about 0.8
O3 about 1.1.

Gas G'1, G'2 and G'3 respectively leaves each zone. In the embodiment of FIG. 3, the gases are mixed and at least partially taken up in compressor (29) to be used again for combustion, clearly after at least partial elimination of water and other species from the combustion step, and after possible cooling (by quenching, for example) if necessary.

FIG. 3 describes a disposition in which the gases from the combustion and finishing zones are mixed, treated and recycled to the zones as the incoming gas.

More generally, the gases extracted from at least two zones are collected and re-introduced after possible treatment at least in part into at least one combustion zone after optional addition of oxygen.

It is preferably recycled to the first combustion zone.

The aim of the treatment is to eliminate water and other combustion products or "side" products (such as chlorine).

It is also important to re-introduce the gas from the FC zone (optionally mixed with the gas from the last combustion zone) at least in part into zone FC and/or at least in part into at least one combustion zone, preferably into the first combustion zone, clearly after optional addition of oxygen to form the gas entering the zone, in order to optimise the oxygen consumption.

In this case, one preferred embodiment for managing the gases is that shown in FIG. 4. This shows the invention of FIG. 2 with two combustion zones, Gas G'2 (the effluent from the second combustion zone comprising the monitoring and control zone) is cooled in an exchanger (12), washed in an apparatus (13) to eliminate impurities, in particular chlorinated impurities, and a fraction of this effluent is purged via conduit (14), the remaining effluent being dried in a drier (16), then compressed in a compressor (15) and separated into two fractions. One is sent as gas G1 to the first combustion zone after reheating (oven 18) and after adding oxygen by a gas (for example air) supplied to conduit (17). The other fraction is re-heated (oven 19), oxygen (for example air) is added via conduit (20), and re-introduced as gas G3 into the monitoring and control zone. Gas G'1 extracted from the first combustion zone is introduced into zone Z2 after optional addition of oxygen via conduit (20').

The invention is not limited to this embodiment, and the position of some equipment can be modified (for example, placing the drier after the compressor, preferably for all of the effluent), in some cases to reduce the amount of equipment (for example, oven 18 is not used).

The invention also concerns a regeneration vessel for carrying out the process. The vessel comprises at least two radial combustion zones (Z1) and (Z2) disposed in series, at least one conduit (4, 7) for introducing oxygen-containing gas into each combustion zone, at least one conduit (1) for introducing catalyst into the vessel, at least one conduit (3, 6) for transferring catalyst between the zones, at least one conduit (10) for transferring catalyst into the following oxychlorination zone, and at least one conduit (9) for evacuating gases from the combustion zone out of the vessel, conduit (9) being located before the oxychlorination zone, the vessel being characterized in that:

separation means are disposed between the combustion zones to allow the passage of catalyst between said zones in the conduits for this purpose but to prevent the passage of gases between said zones;

and at least one conduit (5, 9) is disposed in each zone to extract the gases after passing through said zone.

In a preferred embodiment (FIG. 2), the lower portion of the last combustion zone (Z2) comprises a combustion completion monitoring and control zone (FC), zone (FC) being provided with at least one conduit (11) for introducing at least one oxygen-containing gas and at least one conduit (9) for extracting the gases after passage through the combustion zone (Z2) and the monitoring and control zone (FC).

In a further preferred embodiment (FIG. 3), the last combustion zone (Z2) is followed by a monitoring and control zone (FC) such that a separation means is disposed between the two zones to allow catalyst to pass but to prevent the passage of gas, said monitoring and control zone being provided with a conduit (27) for introducing an oxygen-containing gas and a conduit (28) for evacuating gas.

Preferably, at least one conduit (5) for evacuating gas from a combustion zone is connected to at least one conduit (7) for introducing oxygen-containing gas into the following zone.

Advantageously, conduit (28, 9) for evacuating gas from the monitoring and control zone (FC) is connected to conduit (4) for introducing oxygen-containing gas into the first combustion zone (Z1) to recycle at least a portion of the gas from monitoring and control zone (FC) to zone (Z1).

In order to monitor and control the operating conditions in each zone, at least one conduit for adding oxygen, optionally at least one means for re-heating gas, and a system for measuring the temperature, the oxygen content and the flow rate are placed in the conduits (4, 7) for introducing oxygen-containing gas into each zone in the vessel, to monitor and adjust the temperature, oxygen content and flow rate as a function of the operating specifications.

What is claimed is:

1. A vessel for regenerating a reforming or aromatic compound production moving bed catalyst, wherein the catalyst comprises a support, at least one noble metal and at least one halogen, said vessel comprising at least two first and second radial combustion zones disposed in series, at least one conduit for introducing an oxygen-containing gas into each combustion zone, at least one conduit for introducing the catalyst into the vessel, at least one conduit for transferring the catalyst between the zones, at least one conduit for transferring the catalyst into a following oxychlorination zone, a separation means disposed between the combustion zones to allow the passage of the catalyst between said zones but to prevent the passage of gases between said zones; and at least one conduit is disposed in each zone to extract passed gases.

2. A vessel according to claim 1, wherein a lower portion of the second combustion zone comprises a combustion completion monitoring and control zone, the monitoring and control zone comprises at least one conduit for introducing at least one oxygen-containing gas and at least one conduit for extracting gases after each passage through the second combustion zone and the monitoring and control zone.

3. A vessel according to claim 1 wherein the second combustion zone is followed by a monitoring and control zone wherein a separation means is disposed between the second zone and the monitoring and control zone to allow the catalyst to pass but to prevent the passage of a gas, said monitoring and control zone being provided with a conduit for introducing an oxygen-containing gas and a conduit for evacuating a gas.

4. A vessel according to claim 1, wherein at least one conduit for evacuating a gas from the first or second a combustion zone is connected to at least one conduit for introducing an oxygen-containing gas into a following zone.

5. A vessel according to claim 1, wherein a conduit for evacuating a gas from a monitoring and control zone is connected to a conduit for introducing an oxygen-containing gas into the first combustion zone to recycle at least a portion of the gas from the monitoring and control zone to the first combustion zone.

6. A vessel according to claim 1, further comprising at least one conduit for adding oxygen, and a system placed in each conduit for introducing the oxygen-containing gas into each zone in the vessel, wherein the system measures, monitors and adjusts the temperature, oxygen content and flow rate as a function of the operating specifications.

7. An apparatus for regenerating a reforming or aromatic compound production catalyst comprising:
   a first combustion zone wherein the first combustion zone receives catalyst and an oxygen-containing gas;
   a successive second combustion zone; and
   a conduit communicating the first and second combustion zones for transferring catalysts from the first combustion zone to the second combustion zone wherein the first combustion zone is isolated from the second combustion zone to prevent passage of oxygen-containing gas from the first combustion zone to the second combustion zone and the severity of the operating conditions increases from the first combustion zone to the second combustion zone.

8. The apparatus of claim 7 further comprising:
   a conduit for introducing oxygen-containing gas into the second combustion zone.

9. The apparatus of claim 7 further comprising more than two combustion zones wherein the severity of the operating conditions increases in each zone separately in the direction of catalyst flow.

10. The apparatus of claim 7 further comprising a conduit for extracting gases from the first combustion zone and a conduit for extracting gases from the second combustion zone.

11. The apparatus of claim 7 further comprising a monitor and control zone at the end portion of the last combustion zone.

12. The apparatus of claim 7 wherein the combustion zones are generally radial.

13. The apparatus of claim 7 wherein the combustion zones are annular.

14. A vessel for regenerating a reforming or an aromatic production moving bed catalyst, wherein the catalyst comprises a support, at least one noble metal, and at least one halogen, comprising:
   first and second radial combustion zones disposed in series;
   at least one conduit for introducing an oxygen-containing gas into each combustion zone;
   at least one conduit for introducing the catalyst into the vessel;
   at least one conduit for transferring the catalyst between the zones;
   at least one conduit for transferring the catalyst into a following oxychlorination zone;
   a separation means disposed between the combustion zones to allow passage of the catalyst between the zones to prevent passage of gases between said zones;
   at least one conduit disposed in each zone to extract passed gases;
   at least one conduit for adding oxygen; and
   a system placed in each conduit introducing the oxygen-containing gas for measuring, monitoring and adjusting the temperature, oxygen content, and flow rate as a function of the operating specifications.

15. A process for regenerating a moving bed of catalyst flowing in a selected direction for reforming or for aromatic hydrocarbon production, said catalyst comprising a support, at least one noble metal and at least one halogen, the process including a combustion step of treating the catalyst in at least two successive combustion zones, the process comprising:
   maintaining each combustion zone separate from adjacent combustion zones to allow catalyst to pass between adjacent zones and to prevent the passage of gas from one zone to an adjacent zone;
   introducing at least one oxygen-containing gas into each zone wherein the temperature and oxygen content of at least one introduced oxygen-containing gas are measured, and extracting the gases produced from each zone; and
   increasing the severity of the operating conditions in each zone separately in the direction of catalyst flow.

16. A process for regenerating a moving bed of catalyst flowing in a selected direction for reforming or for aromatic hydrocarbon production, said catalyst comprising a support, at least one noble metal and at least one halogen, the process including a combustion step of treating the catalyst in at least two successive combustion zones, the process comprising:

maintaining each combustion zone separate from adjacent combustion zones to allow catalyst to pass between adjacent zones and to prevent the passage of gas from one zone to an adjacent zone;

introducing at least one oxygen-containing gas into each zone, and extracting the gases produced from each zone wherein the oxygen content and temperature of the extracted gas are measured, and increasing the severity of the operating conditions in each zone separately in the direction of catalyst flow.

17. A process for regenerating a moving bed of catalyst flowing in a selected direction for reforming or for aromatic hydrocarbon production, said catalyst comprising a support, at least one noble metal and at least one halogen, the process including a combustion step of treating the catalyst in at least two successive combustion zones, the process comprising:

maintaining each combustion zone separate from adjacent combustion zones to allow catalyst to pass between adjacent zones and to prevent the passage of gas from one zone to an adjacent zone;

introducing at least one oxygen-containing gas into each zone, and extracting the gases produced from each zone;

increasing the severity of the operating conditions in each zone separately in the direction of the catalyst flow; and the bed further comprises an inlet and an outlet, wherein:

the maximum temperature at the bed outlet is dependent upon the maximum allowable temperature of the material or materials comprising the bed;

the difference between the bed inlet and outlet temperature is less than 100° C.;

the temperature in each zone is at least 350° C.; and the temperature in each successive zone is higher than the immediate preceding zone.

18. A process for regenerating a moving bed of catalyst flowing in a selected direction for reforming or for aromatic hydrocarbon production, said catalyst comprising a support, at least one noble metal and at least one halogen, the process including a combustion step of treating the catalyst in at least two successive combustion zones, the process comprising:

maintaining each combustion zone separate from adjacent combustion zones to allow catalyst to pass between adjacent zones and to prevent the passage of gas from one zone to an adjacent zone;

introducing at least one oxygen-containing gas into each zone, and extracting the gases produced from each zone;

increasing the severity of the operating conditions in each zone separately in the direction of catalyst flow; and removing chlorinated impurities from at least one introduced oxygen-containing gas.

* * * * *

UNITED STATES PATENT AND TRADEMARK OFFICE
CERTIFICATE OF CORRECTION

PATENT NO. : 6,689,331 B1
DATED : February 10, 2004
INVENTOR(S) : François-Xavier Brunet et al.

It is certified that error appears in the above-identified patent and that said Letters Patent is hereby corrected as shown below:

<u>Column 9</u>
Line 21, reads "to allow the passage" should read -- to allow passage --
Line 41, reads "first or second a" should read -- first or second --

Signed and Sealed this

Fourth Day of January, 2005

JON W. DUDAS
*Director of the United States Patent and Trademark Office*